(12) United States Patent
Bugenhagen (10) Patent No.: US 7,916,742 B1
(45) Date of Patent: Mar. 29, 2011

(54) DYNAMIC JITTER BUFFER CALIBRATION

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 921 days.

(21) Appl. No.: 11/126,566

(22) Filed: May 11, 2005

(51) Int. Cl.
*H04L 12/56* (2006.01)

(52) U.S. Cl. ........ 370/412; 370/415; 370/417; 370/516; 370/352; 375/371; 710/56

(58) Field of Classification Search .................. 370/517, 370/235, 235.1, 352, 353, 354, 468, 412–418, 370/516; 709/225–235; 710/56–57; 375/371, 375/372
See application file for complete search history.

(56) References Cited

U.S. PATENT DOCUMENTS

| | | | | |
|---|---|---|---|---|
| 6,105,070 | A * | 8/2000 | Gaylord ........................ | 709/232 |
| 6,301,258 | B1 * | 10/2001 | Katseff et al. ................ | 370/412 |
| 6,418,125 | B1 | 7/2002 | Oran | |
| 6,452,950 | B1 | 9/2002 | Ohlsson et al. | |
| 6,504,838 | B1 | 1/2003 | Kwan | |
| 6,658,027 | B1 * | 12/2003 | Kramer et al. ................ | 370/516 |
| 6,684,273 | B2 | 1/2004 | Boulandet et al. | |
| 6,747,999 | B1 | 6/2004 | Grosberg et al. | |
| 6,757,292 | B2 * | 6/2004 | Pate et al. ..................... | 370/412 |
| 6,765,931 | B1 | 7/2004 | Rabenko et al. | |
| 6,788,651 | B1 | 9/2004 | Brent et al. | |
| 6,859,460 | B1 * | 2/2005 | Chen ............................. | 370/412 |
| 6,862,298 | B1 | 3/2005 | Smith et al. | |
| 7,359,324 | B1 * | 4/2008 | Ouellette et al. ............. | 370/230 |
| 2002/0101885 | A1 * | 8/2002 | Pogrebinsky et al. ........ | 370/516 |
| 2003/0058807 | A1 * | 3/2003 | Hoffmann ..................... | 370/286 |
| 2004/0073641 | A1 * | 4/2004 | Minhazuddin et al. ....... | 709/223 |

FOREIGN PATENT DOCUMENTS

WO    WO 01/93516 A1 * 12/2001

OTHER PUBLICATIONS

Introduction to Circuit Emulation Services over Ethernet The Metro Ethernet Forum 20044.; http://www.metroetharnetforum.org, pp. 1-6.
Peter Meyer, "Circuit Emulation Services-over-Packet and Cellular Backhaul," as published in analog Zone: Zarlink Semiconductor Packet Processing, pp. 1-6.

* cited by examiner

*Primary Examiner* — Aung S Moe
*Assistant Examiner* — Hoon J Chung (57) ABSTRACT

An embodiment of the invention provides for dynamically calibrating a jitter buffer based on a percentage used of the jitter buffer. Such a solution provides for efficiently adapting the size of a jitter buffer without the need for complex and processor intensive operations. By adjusting the size of a jitter buffer in a simple and dynamic fashion, undesirable delay can be removed from a service session, and gaps prevented. Similarly, delay can be easily introduced into a service session when necessary. In an embodiment of the invention, a communication system comprises a jitter buffer and a processing system. The jitter buffer is configured to buffer traffic. The processing system is configured to determine the percentage used of the jitter buffer by the buffered traffic, and calibrate the size of the jitter buffer in response to the percentage used of the jitter buffer.

20 Claims, 6 Drawing Sheets

DYNAMIC JITTER BUFFER CALIBRATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to systems, methods, and software for dynamic jitter buffer calibration in telecommunication networks.

2. Description of the Prior Art

It is commonly known that jitter buffers are located at the end points of most packet communication paths used for real-time applications. For example, jitter buffers are implemented in media gateways and SIP phones. Jitter buffers are also implemented at customer premise equipment, and interim network devices. Jitter buffers are used to reduce the effects of variable latency or delay in packet communication paths. Given the live nature of real-time applications, jitter buffer operations have a large affect on the quality of real-time applications. For example, an end user could experience either a gap in the operation of or a complete cessation of a real-time application as a result of packet jitter.

Jitter buffers can be static or dynamic. Static jitter buffers are pre-configured with a particular size that does not change during operation. When a static jitter buffer becomes congested, packets are simply dropped. Dynamic jitter buffers can be automatically reconfigured to accommodate higher traffic patterns. Dynamic jitter buffers are sometimes referred to as adaptive jitter buffers.

Unfortunately, prior art implementations of dynamic jitter buffers involve high cost protocol analysis methods that require processor intensive operations. For example, some systems utilize impulse driven time series models. In this system, a computer simulation of a network is created to estimate jitter. However, this system does not perform real-time buffer maintenance. In another example, a mean deviation from the short term average delay is calculated to produce a histogram that can be used to determine periods for which jitter would exceed acceptable levels. Unfortunately, this solution is very processor intensive. Lastly, another solution measures the discard rate and adjusts the size of a jitter buffer based on the discard rate. This solution is reactive, rather than pro-active. It would be desirable to dynamically calibrate jitter buffers in an efficient, real-time, and pro-active manner.

SUMMARY OF THE INVENTION

An embodiment of the invention helps solve the above problems and other problems by providing systems, methods, and software products that provide for dynamically calibrating a jitter buffer based on a percentage used of the jitter buffer. Such a solution provides for efficiently adapting the size of a jitter buffer without the need for complex and processor intensive operations. By adjusting the size of a jitter buffer in a simple and dynamic fashion, undesirable delay can be removed from a service session, and gaps prevented. Similarly, delay can be easily introduced into a service session when necessary.

In an embodiment of the invention, a communication system comprises a jitter buffer and a processing system. The jitter buffer is configured to buffer traffic. The processing system is configured to determine the percentage used of the jitter buffer by the buffered traffic, and calibrate the size of the jitter buffer in response to the percentage used of the jitter buffer.

In an embodiment of the invention, the processing system is configured to calibrate the size of the jitter buffer by increasing the size of the jitter buffer.

In an embodiment of the invention, the processing system is configured to calibrate the size of the jitter buffer by decreasing the size of the jitter buffer.

In an embodiment of the invention, the jitter buffer is further configured to receive traffic for a packet service session between the communication system and another communication system.

In an embodiment of the invention, the packet service session comprises a voice over internet protocol (VoIP) session.

In an embodiment of the invention, the communication system comprises a mobile phone.

In an embodiment of the invention, the communication system comprises a media gateway.

In an embodiment of the invention, the communication system comprises a media gateway controller.

In an embodiment of the invention, a method of operating a communication system having a jitter buffer comprises buffering traffic in the jitter buffer, determining the percentage used of the jitter buffer by the buffered traffic, and calibrating the size of the jitter buffer in response to the percentage used of the jitter buffer.

In an embodiment of the invention, calibrating the size of the jitter buffer comprises increasing the size of the jitter buffer.

In an embodiment of the invention, calibrating the size of the jitter buffer comprises decreasing the size of the jitter buffer.

An embodiment of the invention, the method includes receiving traffic in the jitter buffer for a packet service session between the communication system and another communication system.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
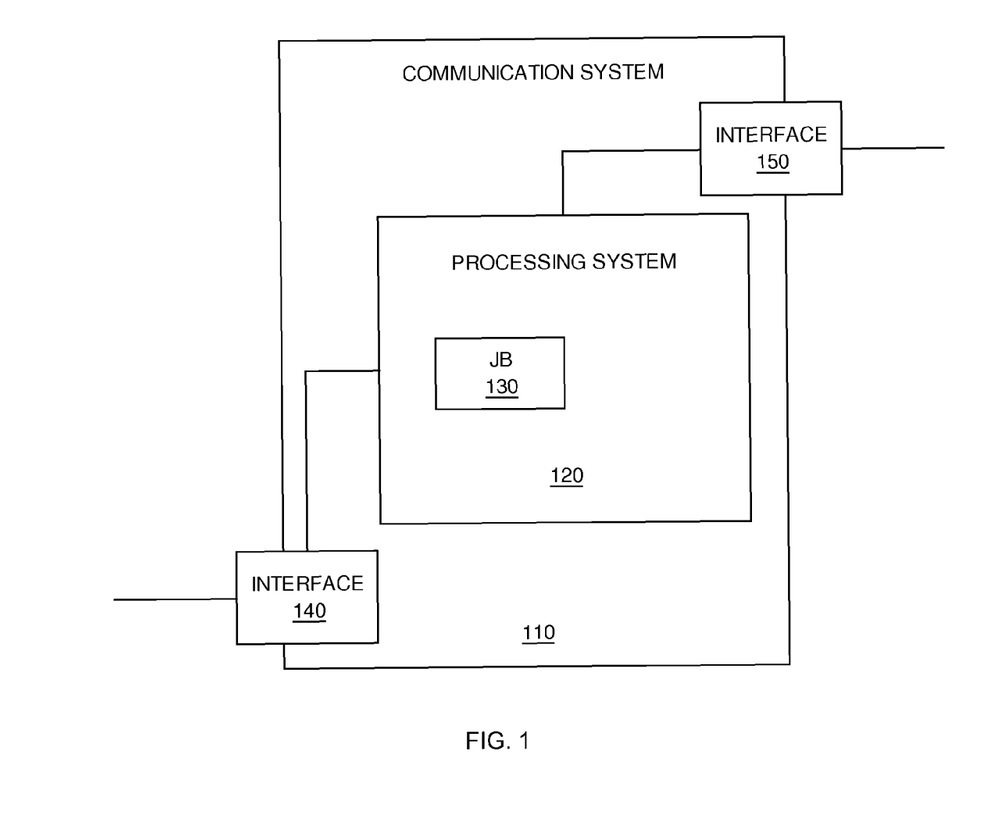
FIG. 1 illustrates a communication system in an embodiment of the invention.
Figure 2:
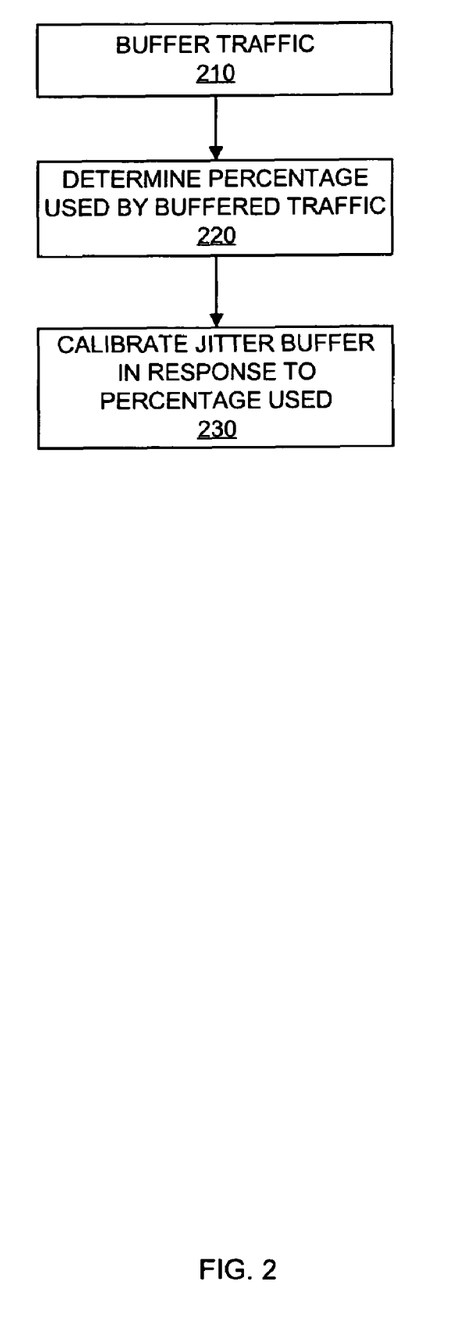
FIG. 2 illustrates the operation of a communication system in an embodiment of the invention.
Figure 3:
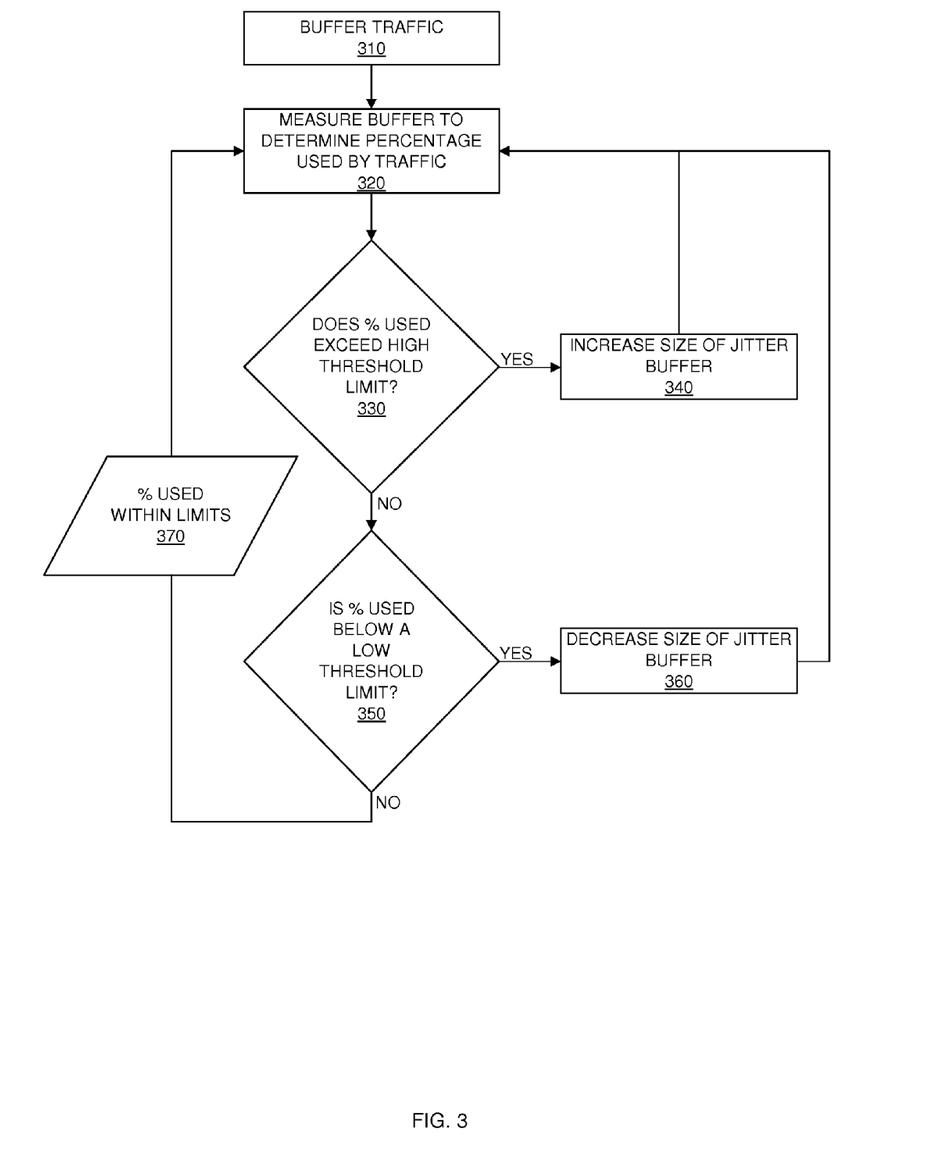
FIG. 3 illustrates the operation of a communication system in an embodiment of the invention.

First Embodiment Configuration and Operation—FIGS. 1-3

FIG. 1 illustrates communication system 110 in an embodiment of the invention. Communication system 110 includes processing system 120, jitter buffer 130, interface 140, and interface 150. Other elements could be included in communication system 110, but have been omitted for the sake of clarity. In operation, communication system 110 handles traffic for a session, such as a voice, video, or data traffic. A session could be, for example, a voice over packet session (VoP), or a video over packet session, as well as other types of sessions.

Interface 140 is any interface capable of receiving and transmitting session traffic to and from communication system 110. Similarly, interface 150 is any interface capable of receiving and transmitting session traffic to and from communication system 110. Session traffic could include bearer traffic as well has session control traffic. Processing system 120 is any processing system capable of processing session traffic. Additionally, processing system 120 is any processing system capable of controlling jitter buffer 130. Jitter buffer 130 is any jitter buffer capable of buffering session traffic.

It should be noted that communication system 110 could be any communication system capable of handling session traffic. For example, communication system 110 could be an end device, such as a personal computer, a video system, a mobile phone, a wireless computer, a music device, a multi-media device, or a pager, as well as other types of end devices. Communication system 110 could also be an intermediate device, such as a media gateway, Pseudo Wire device, VoIP phone station, a media termination system, or a modem system, as well as other types of intermediate systems. Session traffic could be voice traffic, video traffic, audio traffic, or data traffic, as well as other types of traffic.

FIG. 2 illustrates the operation of communication system 110 in an embodiment of the invention. In operation, interface 140 receives session traffic. The session traffic is transferred from interface 140 to jitter buffer 130 in a packet format. Jitter buffer 130 buffers the traffic to reduce jitter from the session traffic (Step 210). While jitter buffer 130 buffers the traffic, processing system 120 determines a percentage used of the jitter buffer by the buffered traffic (Step 220). For example, the buffered traffic could utilize half of the available space on jitter buffer 130. In response to the percentage used of the jitter buffer, processing system 120 calibrates jitter buffer 130. Upon having processed and buffered the traffic, interface 150 transmits the traffic.

FIG. 3 further illustrates the operation of communication system 110 in an embodiment of the invention. In this embodiment, jitter buffer 130 buffers traffic as described above to reduce jitter (Step 310). Processing system 120 monitors jitter buffer 130 to measure the percentage used of jitter buffer 130 by the buffered traffic (Step 320). Processing system 120 determines whether or not the percentage used exceeds a high threshold limit (Step 330). If so, processing system 120 increases the size of jitter buffer 130 to accommodate the buffered traffic (Step 340). If not, processing system 120 determines if the percentage used is below a low threshold limit that is less than the high threshold limit (Step 350). If so, the size of jitter buffer 130 is reduced (Step 360). If not, the percentage used of the jitter buffer falls within an acceptable range and the size of the jitter buffer remains constant. This process can be repeated periodically. Buffer adjustments can be logged for later network analysis and configuration Advantageously, communication system 110 allows for dynamically maintaining the percentage used of jitter buffer 130 within a desirable range. When the size of a jitter buffer is too large, session traffic is delayed and end users experience undesirable delay. When the size of a jitter buffer is too small, end users experience undesirable gaps in traffic as some traffic is lost or discarded. Dynamically adjusting the size of a jitter buffer based upon a percentage used of the jitter buffer advantageously maintains the size of the jitter buffer within a preferred range whereby end users neither experience traffic gaps nor delay. In addition, changing the size of a jitter buffer based on a percentage used is less processor intensive and more pro-active than prior art solutions. And the system can now track packet flow performance by watching how the jitter buffer historically increased or decreased it's size. This logging function provides a flow by flow histogram. The ability to log and detect this higher level of network performance is very useful as an operational measures trouble shooting and pro-active alarming of real-time packet flows.

Figure 4:
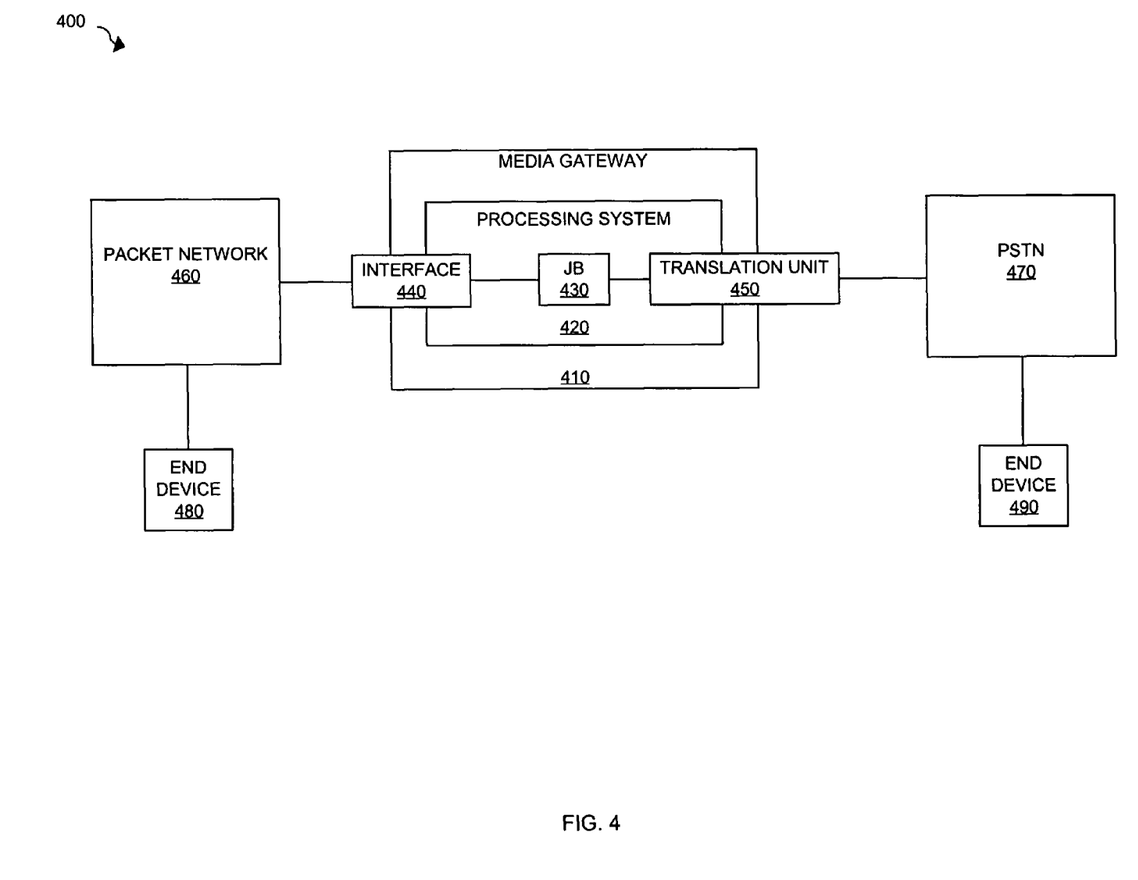
FIG. 4 illustrates a communication network in an embodiment of the invention.
Figure 5:
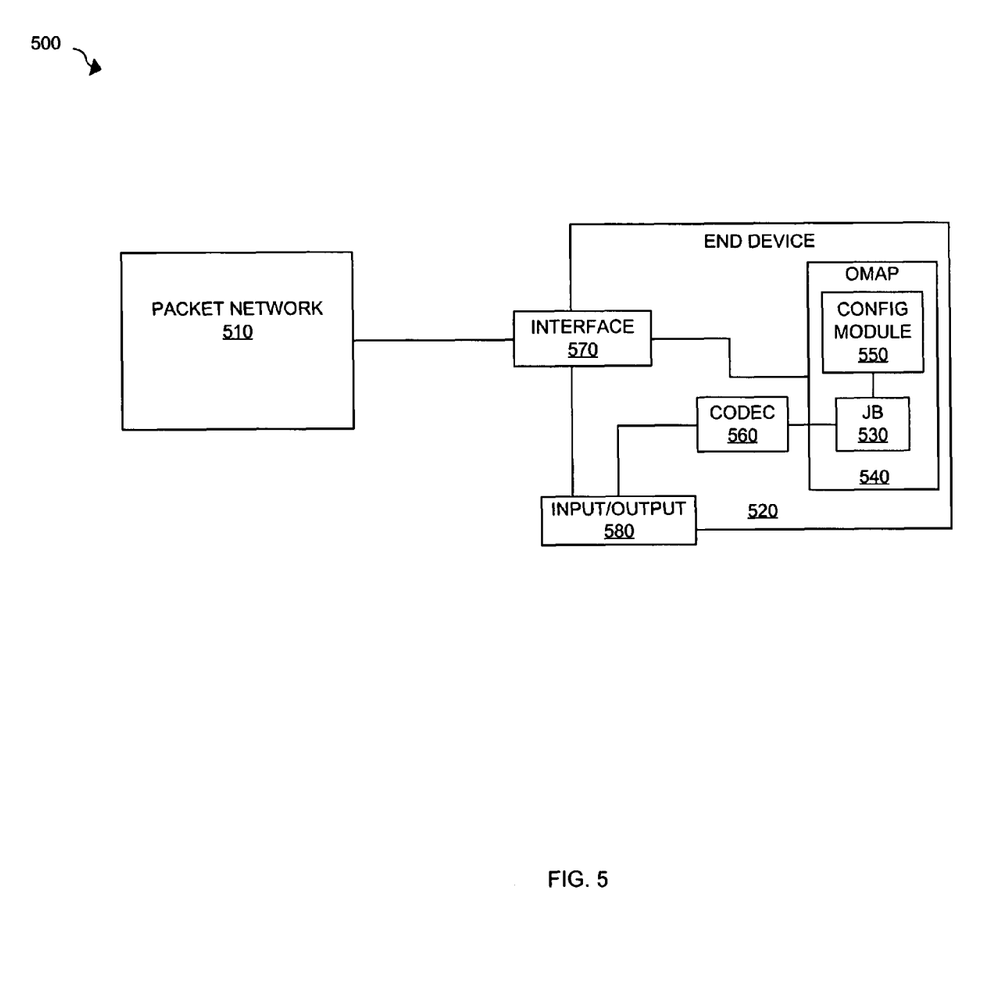
FIG. 5 illustrates a communication network in an embodiment of the invention.

Second Embodiment Configuration and Operation—FIGS. 4 and 5

FIG. 4 illustrates communication network 400 in an embodiment of the invention. Communication network 400 includes media gateway 410, packet network 460, and public switched telephone network (PSTN) 470. End device 480 is coupled with packet network 460. End device 490 is coupled with PSTN 470. Packet network 460 is any network or group of networks well known in the art that operate in accordance with asynchronous packet protocols. As is also well known in the art, PSTN 470 handles communications in accordance with synchronous protocols. Media gateway 410 interworks traffic between packet network 460 and PSTN 470. Other elements could be included in communication network 400, but are omitted for the sake of clarity.

Media gateway 410 includes processing system 420, jitter buffer 430, interface 440, and translation unit 450. Translation unit 450 receives traffic in a time division multiplexed TDM format and translates the traffic to a packet format. Translation unit 450 receives the traffic at various levels and therefore translates the traffic at varying rates. This variance causes jitter that requires correction by jitter buffer 430. Jitter buffer 430 receives the converted packet traffic and buffers the traffic to reduce the jitter. Traffic is then output to interface 440. Interface 440 provides an interface to packet network 460. Similarly, traffic arriving at interface 440 from packet network 460 is also buffered by jitter buffer 430. A smooth output is then provided to translation unit 450 for conversion to a TDM format. The TDM traffic is then sent to PSTN 470.

In operation, a voice over packet session is setup between end device 480 and end device 490. The voice session could be, for example, a VoIP session. The session is setup in accordance with procedures well known in the art. During such a session, voice traffic is exchanged between end devices 480 and 490 over packet network 460 and PSTN 470. Media gateway 410 provides a gateway from PSTN 470 to packet network 460. Packet voice traffic from end device 480 is converted to TDM traffic for end device 490. Similarly, TDM traffic form end device 490 is converted to a packet format for end device 480.

During operation, processing system 420 controls jitter buffer 430. Traffic sent from PSTN 470 to packet network 460 will be referred to as incoming traffic. Traffic sent from packet network 460 will be referred to as outgoing traffic. Jitter buffer 430 could be comprised of an incoming traffic buffer and an outgoing traffic buffer. Processing system 420 monitors jitter buffer 430 to determine the percent utilization jitter buffer 430 by buffered traffic. If the percent utilization exceeds an upper threshold, the size of the jitter buffer is increased. If the percent utilization falls below a lower threshold, the size of the jitter buffer is decreased.

FIG. 5 illustrates communication network 500 in an embodiment of the invention. Communication network 500 includes packet network 510 and end device 520. End device 520 includes operations and management module (OMAP) 540. Within OMAP 540 is configuration module 550 and jitter buffer 530. End device 520 also includes interface 570, input/output module 580, and coder/decoder (Codec) 560.

In operation, end device 520 is in communication with packet network 510 over a packet protocol. Other intermediate elements, such as a wireless base station or a local area network (LAN) switch, are not shown for the purpose of clarity. During a session, such as a VoIP session, a user provides voice input to input/output 580. Codec 560 encodes the voice input into a digital signal. The digital signal provided to OMAP 540 for further processing. Lastly, the packetized signal is provided to interface 570 for transmission to packet network 510.

Traffic arriving from packet network 510 is received at interface 570. Interface 570 could be, for example, a radio frequency (RF) transceiver, assuming end device 520 is a wireless device. Alternatively, interface 570 could be an Ethernet interface, as well as other types of packet interfaces well known in the art. End device 520 could also be a wireline device as opposed to a wireless device. Interface 570 transfers the traffic to OMAP 540 for processing. Traffic received from packet network 510 often times contains jitter and requires buffering to smooth out the signal. Thus, the OMAP 540 transfers the traffic to jitter buffer 530 for buffering. Jitter buffer 530 smoothes out the traffic pattern and provides a traffic stream to codec 560 for decoding. The decoded traffic is transferred to input/output module 580. Assuming the output module includes a speaker, the traffic is broadcast to the user in an audible format. Alternative, the output could include a display module whereby the traffic is displayed.

As discussed above with respect to FIG. 4, the jitter buffer 530 can be recalibrated or reconfigured based upon the percent used by buffered traffic. OMAP 540 monitors and controls jitter buffer 530. If the percent utilization exceeds an upper threshold, the size of the jitter buffer is increased. If the percent utilization falls below a lower threshold, the size of the jitter buffer is decreased.

Advantageously, communication networks 400 and 500 allow for dynamically maintaining the percentage used of a jitter buffer within a desirable range. When the size of a jitter buffer is too large, session traffic is delayed and end users experience undesirable delay. When the size of a jitter buffer is too small, end users experience undesirable gaps in traffic as some traffic is lost or discarded. Dynamically adjusting the size of a jitter buffer based upon a percentage used of the jitter buffer advantageously maintains the size of the jitter buffer within a preferred range whereby end users neither experience traffic gaps nor delay. In addition, changing the size of a jitter buffer based on a percentage used is less processor intensive and more pro-active than prior art solutions.

Figure 6:
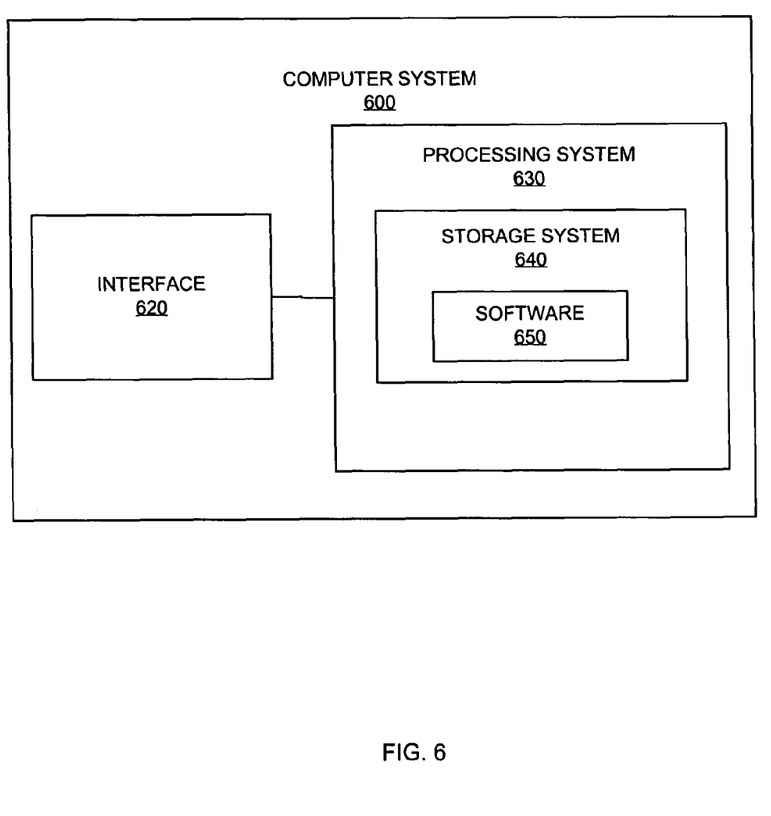
FIG. 6 illustrates a computer system in an embodiment of the invention.

FIG. 6 illustrates computer system 600 in an embodiment of the invention. Computer system 600 includes interface 620, processing system 630, storage system 640, and software 650. Storage system 640 stores software 650. Processing system 630 is linked to interface 620. Computer system 600 could be comprised of a programmed general-purpose computer, although those skilled in the art will appreciate that programmable or special purpose circuitry and equipment may be used. Computer system 600 may use a client server architecture where operations are distributed among a server system and client devices that together comprise elements 620-650.

Interface 620 could comprise a network interface card, modem, port, or some other communication device. Signaling interface 620 may be distributed among multiple communication devices. Interface 630 could comprise a computer microprocessor, logic circuit, or some other processing device. Processing system 630 may be distributed among multiple processing devices. Storage system 640 could comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a general-purpose computer. Software 650 could also comprise an application program, firmware, or some other form of machine-readable processing instructions. When executed by the processing system 630, software 650 directs processing system 630 to operate as described for communication system 110, media gateway 410, and end device 520.

What is claimed is:

1. A method of operating a communication system having a jitter buffer, the method comprising:
   buffering traffic in the jitter buffer;
   determining a percentage used of the jitter buffer by the buffered traffic;
   determining if the percentage used is above a high threshold limit or below a low threshold limit that is less than the high threshold limit;
   if the percentage used is above the high threshold limit, then processing a size of the jitter buffer and the percentage used to increase the size of the jitter buffer, wherein the increased size of the jitter buffer places the percentage used within a predetermined percentage used range of the jitter buffer; and
   if the percentage used is below the low threshold limit, then processing the size of the jitter buffer and the percentage used to decrease the size of the jitter buffer, wherein the decreased size of the jitter buffer places the percentage used within the predetermined percentage used range of the jitter buffer.

2. The method of claim 1 wherein the low threshold limit is greater than zero percent and is less than one hundred percent.

3. The method of claim 2 wherein the high threshold limit is greater than zero percent and is less than one hundred percent.

4. The method of claim 1 further comprising receiving traffic in the jitter buffer for a packet service session between the communication system and another communication system.

5. The method of claim 4 wherein the packet service session comprises a Voice over Internet Protocol (VoIP) session.

6. The method of claim 4 wherein the communication system comprises a mobile phone.

7. The method of claim 4 wherein the communication system comprises a Media Gateway.

8. The method of claim 1 wherein the low threshold limit is greater than zero percent and is less than one hundred percent.

9. The method of claim 8 wherein the high threshold limit is greater than zero percent and is less than one hundred percent.

10. The method of claim 1 further comprising receiving the traffic in the jitter buffer for a Voice over Internet Protocol (VoIP) session between the PSTN and the packet network.

11. A media gateway comprising:
  a translation unit configured to receive traffic in a time division multiplexed (TDM) format from a public switched telephone network (PSTN), translate the traffic in the TDM format to a packet format, and transfer the traffic in the packet format to a jitter buffer;
  the jitter buffer configured to buffer the traffic in the packet format;
  a processing system configured to determine a percentage used of the jitter buffer by the buffered traffic, and determine if the percentage used is above a high threshold limit or below a low threshold limit that is less than the high threshold limit;
  if the percentage used is above the high threshold limit, then the processing system is configured to process a size of the jitter buffer and the percentage used to increase the size of the jitter buffer, wherein the increased size of the jitter buffer places the percentage used within a predetermined percentage used range of the jitter buffer;
  if the percentage used is below the low threshold limit, then the processing system is configured to process the size of the jitter buffer and the percentage used to decrease the size of the jitter buffer, wherein the decreased size of the jitter buffer places the percentage used within the predetermined percentage used range of the jitter buffer; and
  a packet interface configured to transfer the traffic in the packet format from the jitter buffer for delivery over a packet network.

12. The media gateway of claim 11 wherein the low threshold limit is greater than zero percent and is less than one hundred percent.

13. The media gateway of claim 12 wherein the high threshold limit is greater than zero percent and is less than one hundred percent.

14. The media gateway of claim 11 wherein the jitter buffer is further configured to receive the traffic in the jitter buffer for a packet service session between the PSTN and the packet network.

15. The media gateway of claim 14 wherein the packet service session comprises a Voice over Internet Protocol (VoIP) session.

16. The media gateway of claim 14 wherein the packet interface is configured to transfer the traffic in the packet format for delivery to a mobile phone over the packet network.

17. The media gateway of claim 14 comprising:
  the packet interface configured to receive further traffic in the packet format and transfer the further traffic in the packet format to the jitter buffer;
  the jitter buffer configured to buffer the further traffic in the packet format in the jitter buffer; and
  the translation unit configured translate the further traffic in the packet format from the jitter buffer to the TDM format, and transfer the further traffic in the TDM format over the PSTN.

18. The media gateway of claim 14 comprising:
  the processing system configured to monitor changes in the size of the jitter buffer to provide a histogram of increases and decreases in the size of the jitter buffer.

19. A method of operating a media gateway, the method comprising:
  receiving traffic in a time division multiplexed (TDM) format from a public switched telephone network (PSTN);
  translating the traffic in the TDM format to a packet format and transferring the traffic in the packet format to a jitter buffer;
  buffering the traffic in the packet format in the jitter buffer;
  determining a percentage used of the jitter buffer by the buffered traffic;
  determining if the percentage used is above a high threshold limit or below a low threshold limit that is less than the high threshold limit;
  if the percentage used is above the high threshold limit, then processing a size of the jitter buffer and the percentage used to increase the size of the jitter buffer, wherein the increased size of the jitter buffer places the percentage used within a predetermined percentage used range of the jitter buffer;
  if the percentage used is below the low threshold limit, then processing the size of the jitter buffer and the percentage used to decrease the size of the jitter buffer, wherein the decreased size of the jitter buffer places the percentage used within the predetermined percentage used range of the jitter buffer; and
  transferring the traffic in the packet format from the jitter buffer for delivery over a packet network.

20. The method of claim 19 further comprising:
  receiving further traffic in the packet format and transferring the further traffic in the packet format to the jitter buffer;
  buffering the further traffic in the packet format in the jitter buffer;
  translating the further traffic in the packet format from the jitter buffer to the TDM format; and
  transferring the further traffic in the TDM format over the PSTN.

* * * * *